US007054986B2

(12) United States Patent
Zhao et al.

(10) Patent No.: US 7,054,986 B2
(45) Date of Patent: May 30, 2006

(54) PROGRAMMABLE CPU/INTERFACE BUFFER STRUCTURE USING DUAL PORT RAM

(75) Inventors: Sheng Zhao, Coquitlam (CA); Wong Aries, Vancouver (CA); Ming-Hui Lin, Richmond (CA)

(73) Assignee: Nokia Corporation, Espoo (FI)

( * ) Notice: Subject to any disclaimer, the term of this patent is extended or adjusted under 35 U.S.C. 154(b) by 442 days.

(21) Appl. No.: 09/823,159

(22) Filed: Mar. 30, 2001

(65) Prior Publication Data

US 2004/0225779 A1    Nov. 11, 2004

(51) Int. Cl.
*G06F 13/36* (2006.01)
*G06F 13/28* (2006.01)

(52) U.S. Cl. .................... 710/310; 710/22; 710/52; 710/56; 710/308

(58) Field of Classification Search ................ 710/310, 710/311, 52, 56, 22; 711/149, 150, 151; 305/230.03, 230.05, 230.08
See application file for complete search history.

(56) References Cited

U.S. PATENT DOCUMENTS

| 4,839,791 | A | | 6/1989 | Ito ............................ 364/200 |
| 5,072,420 | A | * | 12/1991 | Conley et al. ................ 710/57 |
| 5,386,532 | A | * | 1/1995 | Sodos ......................... 710/22 |
| 5,388,237 | A | * | 2/1995 | Sodos ......................... 710/22 |
| 5,784,649 | A | * | 7/1998 | Begur et al. .................. 710/52 |
| 5,797,043 | A | * | 8/1998 | Lewis et al. .................. 710/56 |
| 5,963,499 | A | | 10/1999 | Leong et al. ........... 365/230.03 |
| 6,044,225 | A | | 3/2000 | Spencer et al. .............. 395/872 |
| 6,058,149 | A | * | 5/2000 | Sato ............................ 375/365 |
| 6,081,852 | A | * | 6/2000 | Baker ......................... 710/24 |
| 6,122,680 | A | * | 9/2000 | Holm et al. .................. 710/52 |
| 6,226,338 | B1 | * | 5/2001 | Earnest ....................... 375/372 |
| 6,242,946 | B1 | * | 6/2001 | Veenstra ...................... 326/41 |
| 6,263,390 | B1 | * | 7/2001 | Alasti et al. ................. 710/308 |
| 6,330,626 | B1 | * | 12/2001 | Dennin et al. ................ 710/52 |
| 6,400,635 | B1 | * | 6/2002 | Ngai et al. ............. 365/230.05 |
| 6,470,409 | B1 | * | 10/2002 | Ridgeway .................... 710/305 |

FOREIGN PATENT DOCUMENTS

EP    0550163 A1    7/1992

* cited by examiner

*Primary Examiner*—Rehana Perveen
*Assistant Examiner*—Nimesh Patel
(74) *Attorney, Agent, or Firm*—Harrington & Smith, LLP

(57) ABSTRACT

Disclosed is a programmable buffer circuit (16) for interfacing a CPU (12) to a plurality of channel interfaces (14). The buffer circuit includes a dual port memory (18) having a first port coupled to a CPU data bus and a second port coupled to a channel data bus that serves the plurality of channel interfaces. The buffer circuit further includes an arbitrator (24) for arbitrating access to the dual port memory by individual ones of the channel interfaces over the channel data bus; an address generator (26) for generating dual port memory addresses for reading and writing data using the CPU data bus and the channel data bus; and a control unit (20) and allocator (22) that are programmable by the CPU for specifying individual ones of buffer locations and sizes within the dual port memory for individual ones of the channel interfaces, and for enabling and disabling individual ones of the buffers.

19 Claims, 11 Drawing Sheets

| FIG. 2A |
|---|
| FIG. 2B |

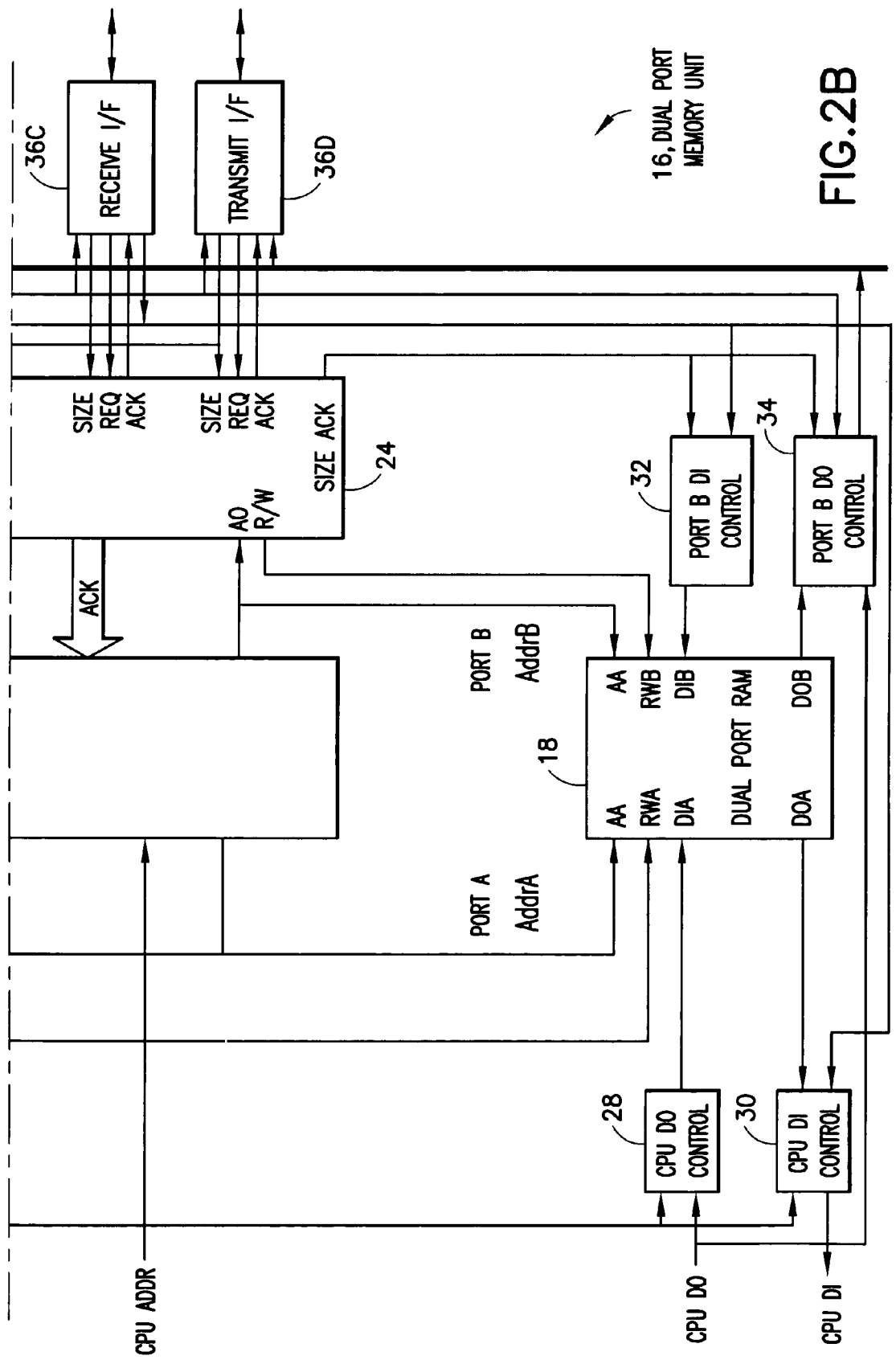

PROGRAMMABLE CPU/INTERFACE BUFFER STRUCTURE USING DUAL PORT RAM

FIELD OF THE INVENTION

This invention relates generally to digital data processing systems and methods and, more particularly, relates to data buffering circuits and methods for use in digital data processing systems.

BACKGROUND OF THE INVENTION

It is common practice in the design of a data processing system with multiple interfaces, such as Ethernet, UART, CODEC, I²C Bus, etc., interfaces, to provide a data buffer, such as a first in/first out (FIFO) buffer, within each of the interface circuits. In this case data is transferred between system memory and the interface circuit buffers by the use of direct memory access (DMA) techniques, or by a central processor unit (CPU) performing read or write operations to remove data from the buffers or to store data in to the buffers. This latter process is sometimes referred to as "programmed I/O".

As can be appreciated, the use of programmed I/O consumes CPU bandwidth, and thus reduces the amount of time that the CPU can spend on other tasks. This results in a decrease of the effective MIPS (millions of instructions per second) of the CPU. The use of DMA can also be disruptive, as the additional loading of the system data bus can cause the CPU to incur wait states when it attempts to access a resource, such the system memory.

SUMMARY OF THE INVENTION

The foregoing and other problems are overcome by methods and apparatus in accordance with embodiments of this invention.

Disclosed is a programmable buffer circuit for interfacing a CPU to a plurality of channel interfaces. The buffer circuit includes a dual port memory having a first port coupled to a CPU data bus and a second port coupled to a channel data bus that serves the plurality of channel interfaces. The buffer circuit further includes an arbitrator for arbitrating access to the dual port memory by individual ones of the channel interfaces over the channel data bus; an address generator for generating dual port memory addresses for reading and writing data using the CPU data bus and the channel data bus; and a control unit and allocator that are programmable by the CPU for specifying individual ones of buffer locations and sizes within the dual port memory for individual ones of the channel interfaces, and for selectively enabling buffers. The allocator has outputs coupled to the address generator for controlling the generation of addresses thereby depending on which channel interface is currently selected by the arbitrator for access to the dual port memory. The control unit is programmable for operating individual ones of the channel buffers in a block access mode or in a first in/first out (FIFO) access mode of operation.

In a preferred embodiment, at least the dual port memory, the CPU and the plurality of interface channels are contained within a common integrated circuit package, such as an ASIC. By example, one of the plurality of interface channels implements an audio CODEC, another one implements a serial data interface, and another one implements a packet data interface channel.

Individual ones of the plurality of interface channels contain a receive interface and a transmit interface, and the allocator includes a corresponding plurality of registers for specifying at least a starting address and a size for each of the receive interface and the transmit interface. The buffer circuit is also programmable for specifying that a receive buffer of one channel interface is to be used as a transmit buffer of another channel interface.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
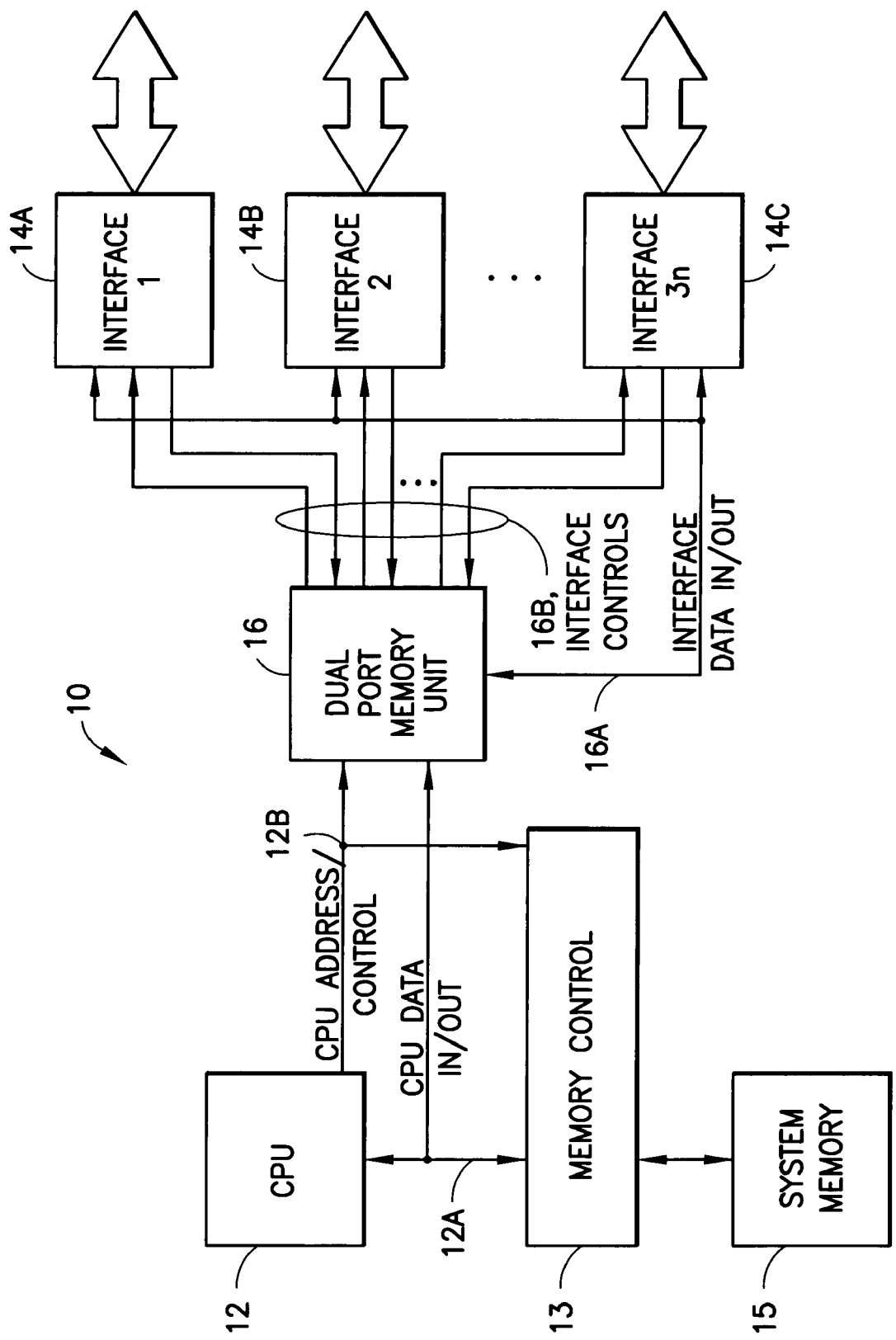
FIG. 1 is an overall block diagram of a data processing system constructed in accordance with the teachings of this invention to include a dual port memory unit (DPMU)

FIG. 1 is an overall block diagram of a data processing system (DPS) 10 constructed in accordance with the teachings of this invention. The DPS 10 includes at least one CPU 12, a plurality of Interface (IF) units 14A, 14B, . . . , 14C, referred to collectively as the IF 14, for coupling to external devices and buses, a dual port memory unit (DPMU) 16 that is constructed and operated in accordance with the teachings herein, a system memory control unit 13 and a system memory 15. While these various circuits and logical blocks can be provided as discrete components, in the presently preferred embodiment many or all of these components are integrated within an integrated circuit package, such as one or more Application Specific Integrated Circuit (ASIC) packages, as will be discussed in detail below. Other types of technologies could be used as well for implementing and embodying these teachings, such as Field Programmable Gate Array (FPGA) and Complex Programmable Logic Device (CPLD) technologies.

In FIG. 1 a plurality of buses are used for interconnecting the various components, including a CPU data in/out bus 12A (also referred to for simplicity as a CPU data bus), a CPU address/control bus 12B, an Interface data in/out bus 16A (also referred to for simplicity as an interface data bus or as an IF data bus) and an interface controls bus 16B or IF controls bus.

Figures 2, 2A:
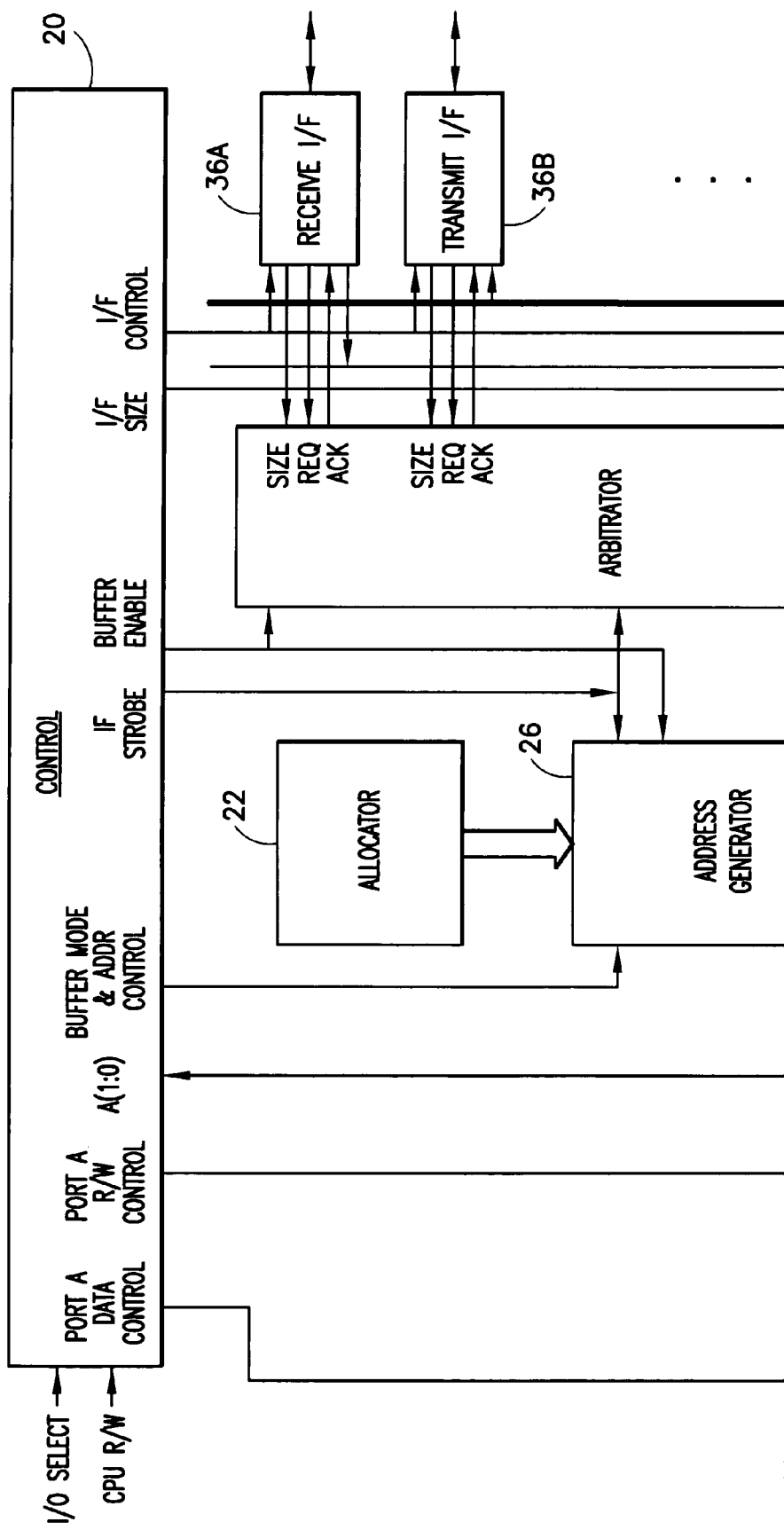
FIG. 2 is a block diagram of the DPMU of FIG. 1.

FIG. 2 is a block diagram of the DPMU 16 of FIG. 1. The DPMU 18 includes a dual port 8 k byte by 8 bit RAM 18 that, in the preferred embodiment, is configured as 4 k bytes by 16 bits at the interface 14 side and as 2 k bytes by 32 bits at the CPU 12 side. The CPU 12 can access the dual port RAM by byte, half word (16 bits) or words (32 bits). The dual port RAM 18 is configured through the use of various controls and other circuitry discussed below to provide a plurality of different buffer types and access modes. As an example, for a buffer assigned to a channel of an interface 14, the CPU 12 can access the buffer as a Sequential Access Memory (SAM) through a data register address, if the buffer is enabled.

The use of the dual port RAM 18 is preferred, as each interface 14 can access this memory without interfering with CPU 12 bus cycles. Locations within the dual port RAM 18 can be allocated to individual ones of the IF 14 dynamically, with a programmable starting memory address and memory block size. Since all IF 14 data can be transferred between the interface and the dual port RAM 18, there is no need to transfer this data to the system memory 15, thereby improving the performance of the CPU 12. A block of dual port RAM memory 18 that is allocated to one of the IFs 14 can be operated in a block mode or in a FIFO mode wherein, by example, an associated one of the IF units 14 stores incoming data into the allocated block of dual port Ram 18, and the CPU 12 reads the stored data out in the first in, first out mode or, alternatively, the CPU 12 stores output data into the allocated block of dual port Ram 18, and the associated one of the IF units 14 reads the stored data out of the allocated block in the first in, first out mode.

Other components shown in FIG. 2 include a control unit 20, a buffer allocator 22, an interface (IF) request arbitrator 24, a dual port RAM 18 address generator 26, CPU 12 data out (DO) and data in (DI) controls 28 and 30, respectively, connected to the data in and data out A ports, respectively of the dual port RAM 18, IF 14 data out (DO) and data in (DI) controls 34 and 32, respectively, connected to the data in and data out B ports, respectively, of the dual port RAM 18, and a plurality of receive and transmit IF units 36A, 36B, 36C and 36D. In general, the buffer allocator 22 is used to set the dual port RAM 18 starting address and block size for each interface 14. The control unit 20 sets the operating mode, while the IF arbitrator 24 resolves IF requests for access to the dual port RAM 18B data ports, and generates acknowledgments (ACKs) to both the Address Generator 26 and IFs 36. The address generator 26 generates the dual port RAM 18 address according to the buffer allocator 22 setup for a particular one of the IFs, and also automatically generates a dual port RAM 18 address for the CPU 12 side when operating in the buffer mode. In the buffer mode the CPU 12 simply reads/writes one location, and the address generator 26 automatically provides the correct address for reading out/writing into the next buffer location in the dual port RAM 18.

A description of these various functional blocks will now be provided.

Figure 3:
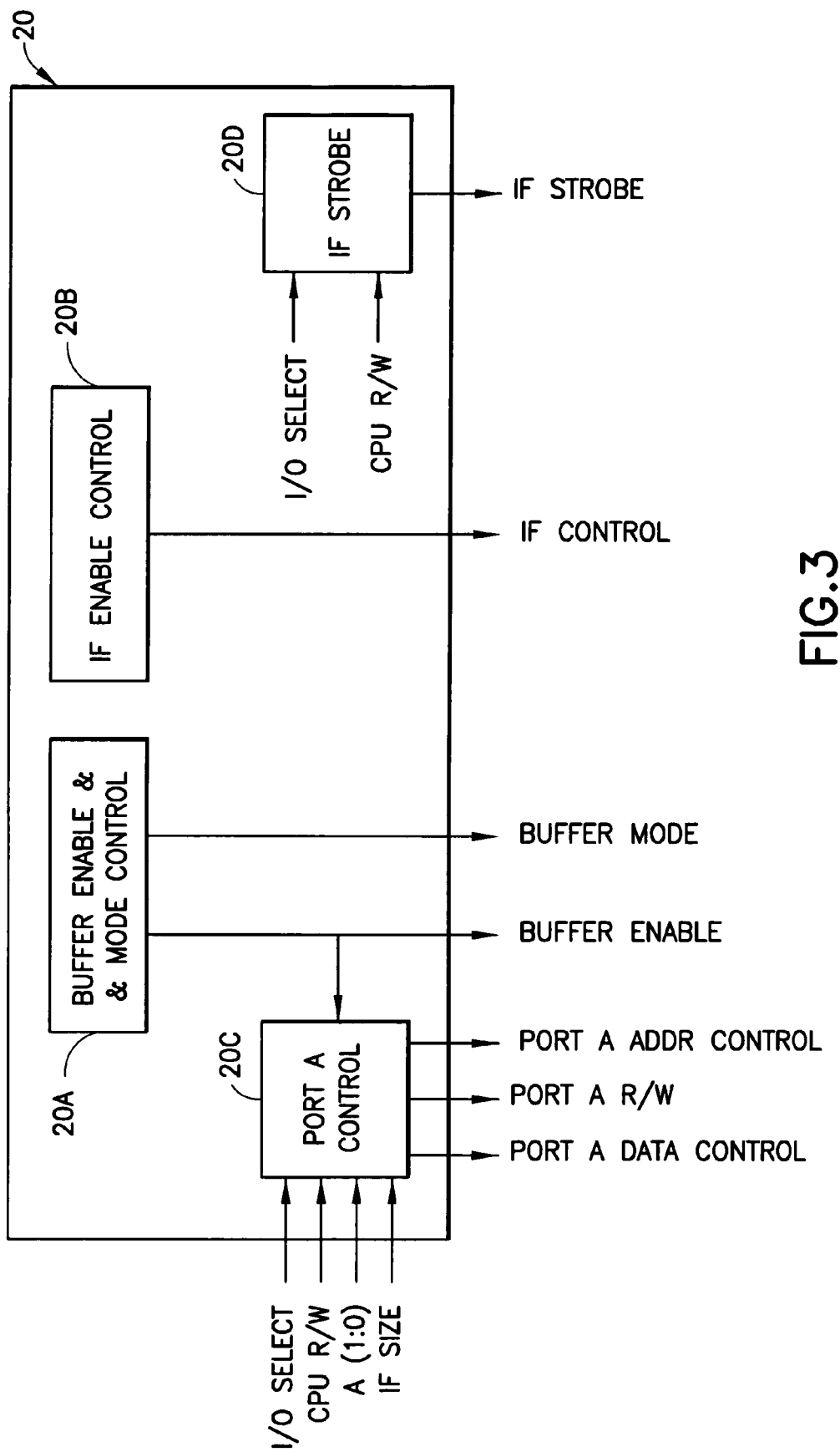
FIG. 3 is a block diagram of the DPMU control unit shown in FIG. 2.

FIG. 3 is a block diagram of the DPMU control unit 20 shown in FIG. 2. The control unit 20 includes a buffer enable and mode control block 20A that generates buffer mode and buffer enable output signals, an IF enable control block 20B that generates IF control output signals, a CPU-side Port A control block 20C that receives the buffer enable signal from the block 20A, as well as I/O select, CPU R/W, low order CPU address bits A(1:0), and IF size signals, and outputs port A address control, port A R/W and port A data control signals. An IF strobe block 20D also receives the I/O select and CPU R/W signals and generates an IF strobe output signal. The control unit 20 performs the following functions: (a) interface function enable/disable; (b) buffer enable/disable and operational mode setting; and (c) the generation of interface data register read strobe signals (for a receive channel) and write strobe signals (for a transmit channel). The control unit 20 also generates CPU 12 side read/write strobe signals and CPU 12 address 12B and data bus 12A controls. If the CPU 12 accesses an IF data register, and if the buffer for that IF channel is enabled, the data is read from/written into dual port RAM 18 through Port A within the allocated address space. The address bus of port A of the dual port RAM 18 is generated by the address generator 26, described below. The control unit 20 also provides control for the IF 14 side data bus 16A.

Figure 4:
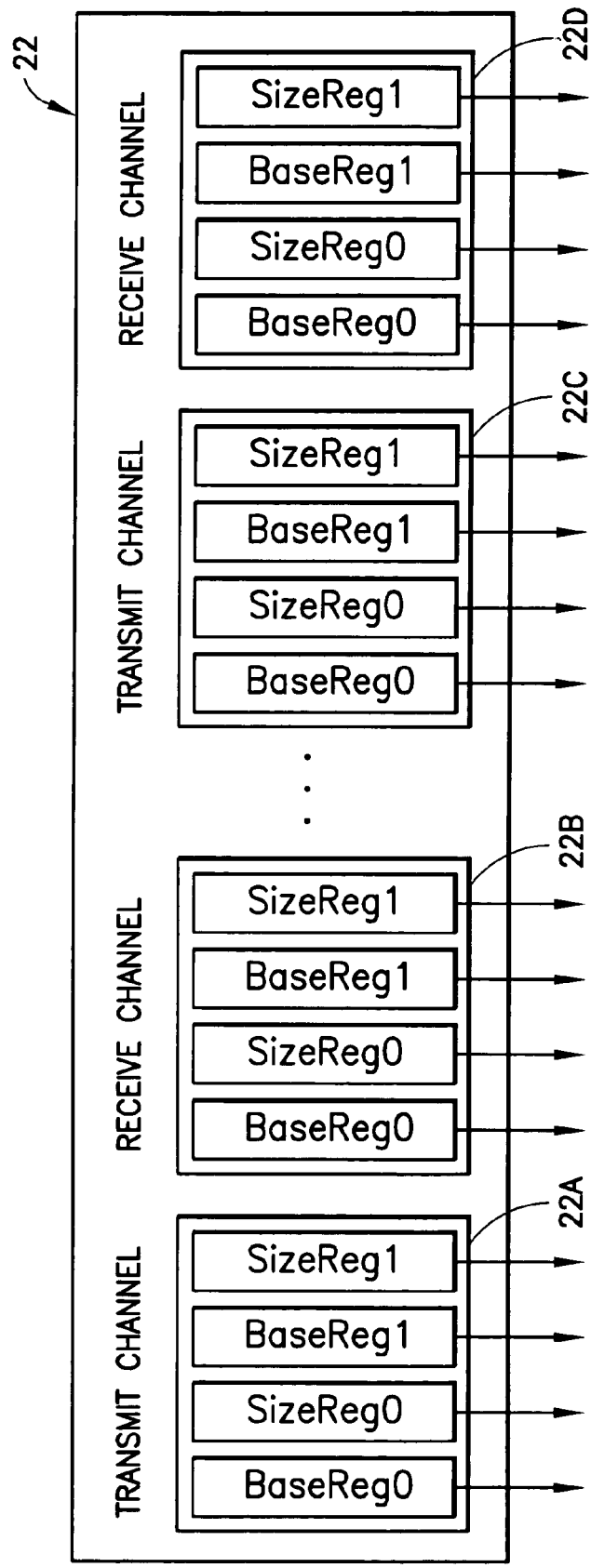
FIG. 4 is a block diagram of the DPMU allocator unit shown in FIG. 2.

FIG. 4 is a block diagram of the DPMU allocator unit 22 shown in FIG. 2. There are four registers in the allocator 22 for each IF channel. That is, there are four transmit channel registers 22A: BaseReg0, BaseReg1, SizeReg0 and SizeReg1 and four receiver channel registers 22B: BaseReg0, BaseReg1, SizeReg0 and SizeReg1.

When operating in the Block Mode, there are two independent buffers (Buffer0 and Buffer1). In this case BaseReg0 stores the starting address of Buffer0, SizeReg0 specifies the allocated Buffer0 size, BaseReg1 stores the start address of Buffer1, and SizeReg1 specifies the allocated Buffer1 size. The address generator 26 uses Buffer0 or Buffer1 based upon control settings and status.

When operating in FIFO Mode, there is only one buffer. BaseReg0 stores the buffer's start address, and SizeReg0 specifies the allocated buffer size. In this case BaseReg1 functions as a Low Threshold Register, and SizeReg1 functions as a High Threshold Register.

In either operational mode, outputs of the four registers for each channel are provided to the address generator 26.

Figure 5:
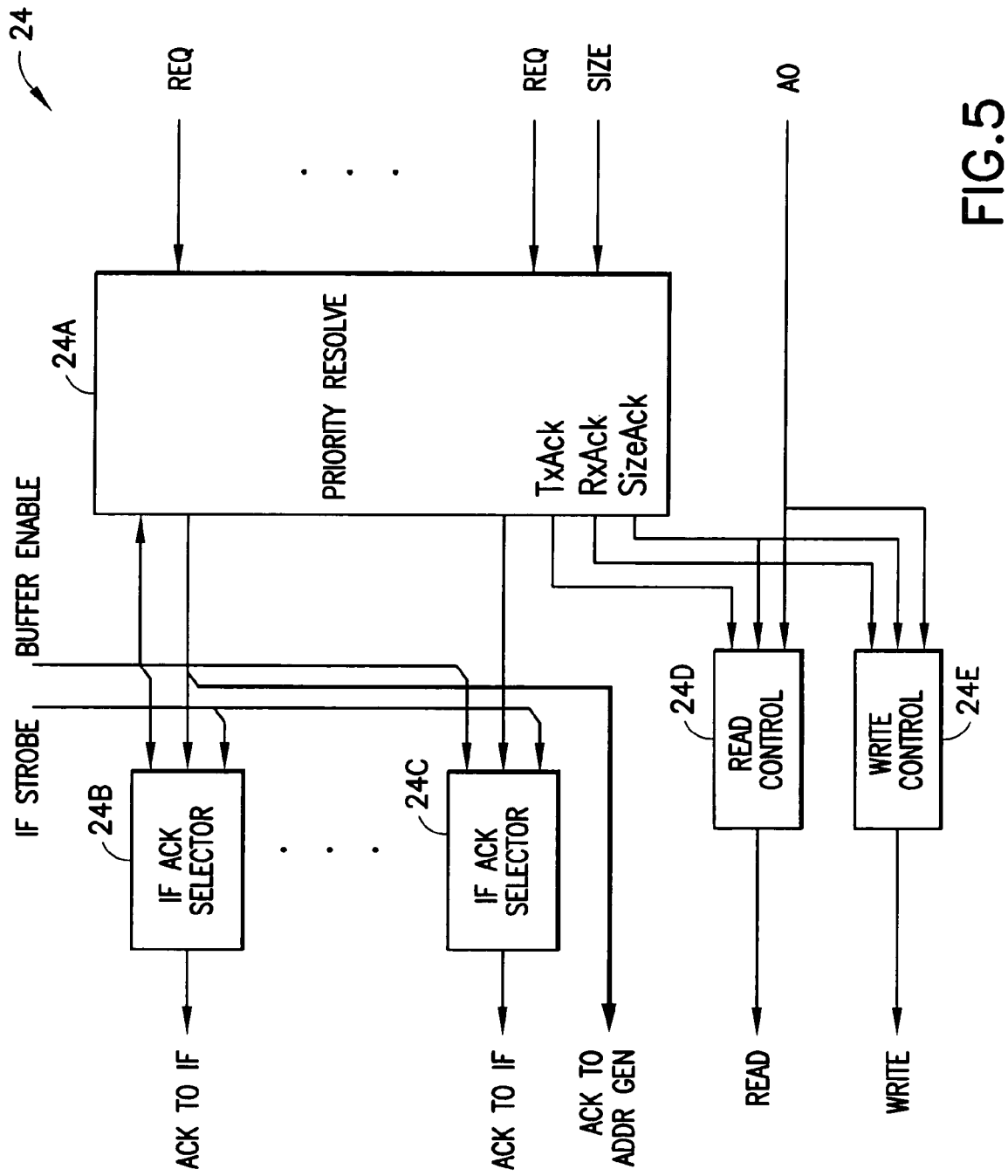
FIG. 5 is a block diagram of the DPMU arbitrator unit shown in FIG. 2.

FIG. 5 is a block diagram of the DPMU arbitrator unit 24 shown in FIG. 2. Functional blocks of the arbitrator unit 24 includes a priority resolution circuit 24A, a plurality of IF ACK selectors 24B to 24C, a read control circuit 24D and a write control circuit 24E. The priority resolution circuit 24A receives IF requests for access to the dual port RAM 18 and corresponding size inputs from the receive and transmit IF channels 36, as well as buffer enable signals from the control unit 20, and outputs ACKs to the Address generator 26 and to the IF ACK selectors 24B, 24C. The dual port RAM 18 read and write control circuits 24D, 24E receive TX ACK and RX ACK signals, respectively, in addition to a size ACK signal and the LSB of the dual port RAM 18 address (A0) from the address generator 26.

The IF request priority resolution circuit 24A may be implemented with a fixed priority, a rotating priority or a programmable priority. Fixed priority is the simplest to implement, but the least flexible.

The acknowledgments (ACKs) from the priority resolution circuit 24A directly drive the address generator circuit 26. If a buffer for an interface channel 36 is enabled (as indicated by the control unit 20), an ACK to the interface channel 36, via the appropriate one of the IF ACK selectors 24B, 24C, is generated by the priority resolution circuit 24A, and the driving signal is the IF strobe signal generated by the control unit 20.

Figure 6:
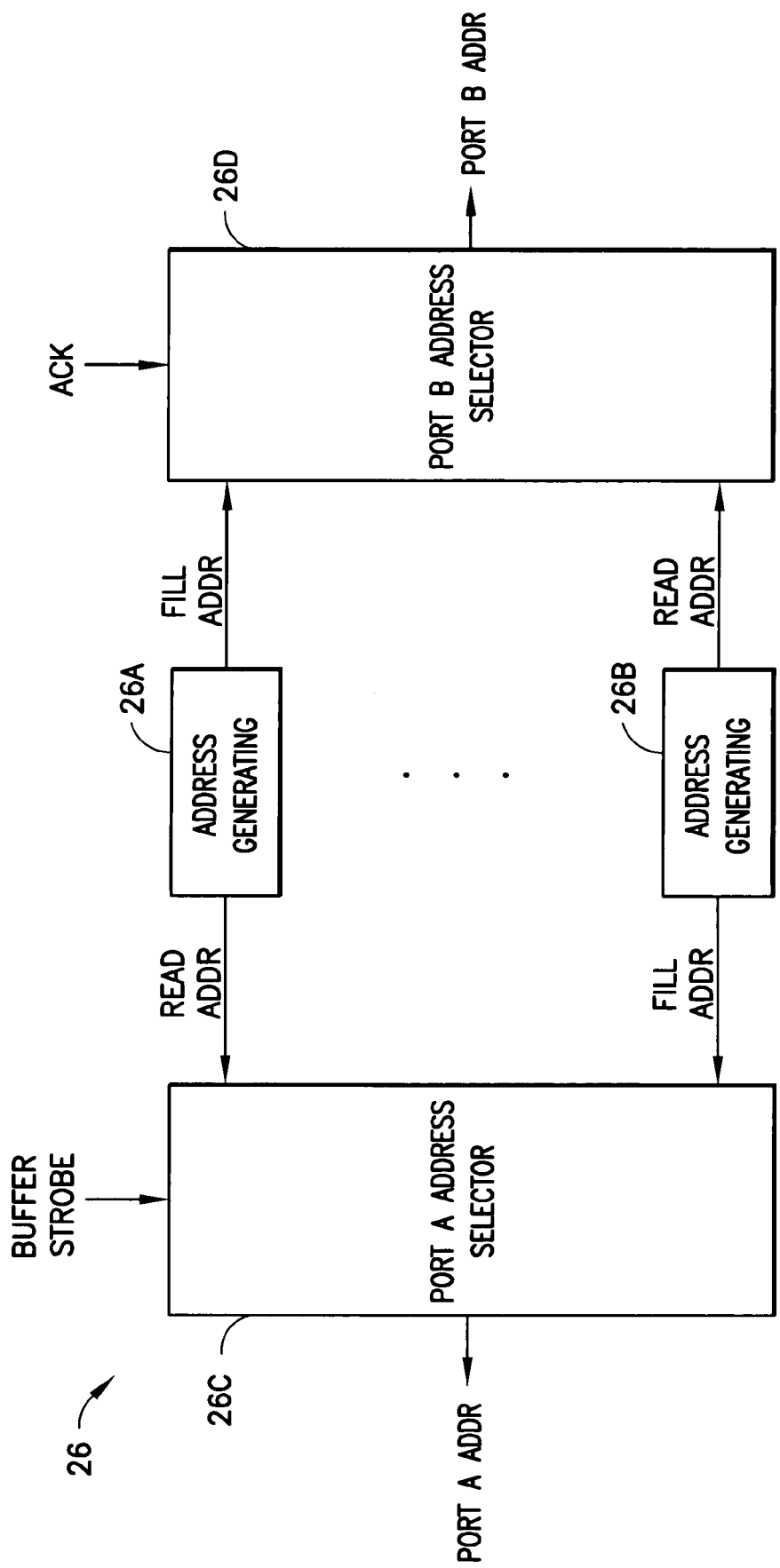
FIG. 6 is a block diagram of the DPMU address generator unit shown in FIG. 2.

FIG. 6 is a block diagram of the DPMU address generator 26 shown in FIG. 2. The address generator 26 includes a plurality of address generating circuits 26A, 26B that feed either dual port RAM 18 port A read or write (Fill) addresses to a dual port RAM 18 port A address selector 26C (CPU 12 side) and that feed either dual port RAM 18 port B read or write (Fill) addresses to a dual port RAM 18 port B address selector 26D (IF 14 side). The Port A address selector 26C receives a buffer strobe signal from the control unit 20, and the Port B address selector 26D receives ACKs from the arbitrator 24.

Figure 7:
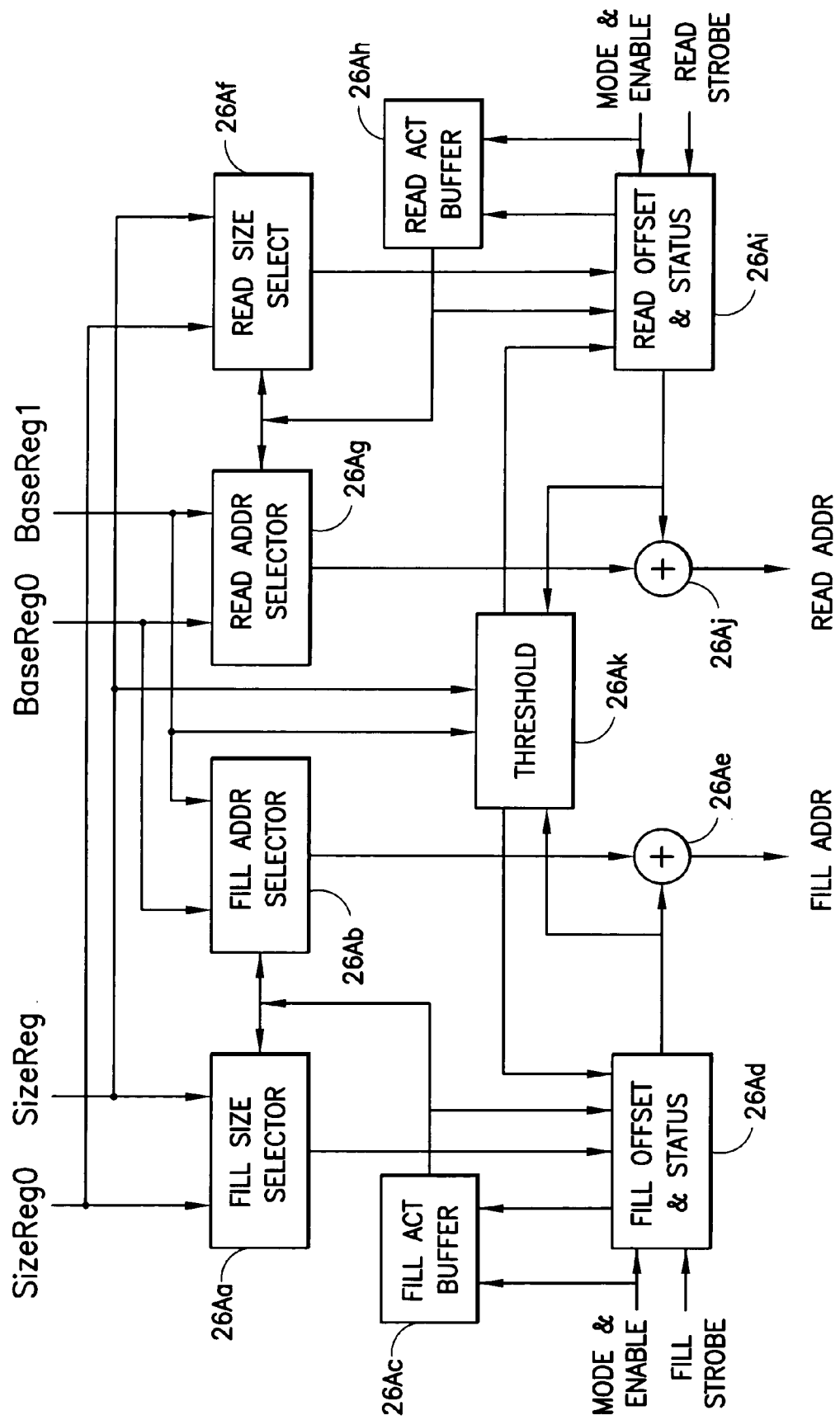
FIG. 7 is a block diagram of one of the plurality of address generating circuits shown in FIG. 6.

FIG. 7 is a block diagram showing the construction of one of the plurality of address generating circuits 26A, 26B shown in FIG. 6. Each address generating circuit 26A, 26B receives corresponding outputs from transmit channel registers (e.g., 22A): i.e., BaseReg0, BaseReg1, SizeReg0 and SizeReg1 and the outputs from the associated receive channel registers (e.g., 22B): i.e., BaseReg0, BaseReg1, SizeReg0 and SizeReg1, provided by the allocator 22.

Each address generating circuit 26A, 26B includes a Fill Address generating circuit, a Read Address generating circuit and a Threshold control. The Fill Address generating circuit includes a Fill Size selector 26Aa that selects SizeReg0 or SizeReg1 from a channel register block of the allocator 22 according the state of Fill Act Buffer 26Ac, a Fill Address Selector 26Ab that selects BaseReg0 or BaseReg1 from a channel register block of the allocator 22 according the state of Fill Act Buffer 26Ac, and a Fill Offset & Status 26Ad that generates an offset according the size given from the Fill Size selector 26Aa and the operating mode. The Fill Address is the sum 26Ae of the selected base address from the Fill Address Selector 26Ab and the offset from Fill Offset & Status 26Ad. The Fill Act Buffer 26Ac toggles state according to the Fill Status in the Block mode to control the Fill Size selector 26Aa to select SizeReg0 or SizeReg1, and to control the Fill Address Selector 26Ab to select BaseReg0 or BaseReg1. The Fill Act Buffer 26Ac is forced to zero to control the Fill Size selector 26Aa to select SizeReg0, and Fill Address Selector 26Ab to select BaseReg0.

The Read Address generating circuit includes a Read Size selector 26Af that selects SizeReg0 or SizeReg1 from a channel register block of the allocator 22 according the state of Read Act Buffer 26Ah, a Read Address Selector 26Ag that selects BaseReg0 or BaseReg1 from a channel register block of the allocator 22 according the state of the Read Act Buffer 26Ah, and a Read Offset & Status 26Ai that generates an offset according the size given from the Read Size selector 26Af and the operating mode. The Read Address is the sum 26Aj of selected base address from Read Address Selector 26Ag and the offset from Read Offset & Status 26Ai. The Read Act Buffer 26Ah toggles state according Read Status in Block mode to control Read Size selector 26Af to select SizeReg0 or SizeReg1, and Read Address Selector 26Ag to select BaseReg0 or BaseReg1. The Read Act Buffer 26Ah is forced to zero to control the Read Size selector 26Af to select SizeReg0, and Read Address Selector 26Ag to select BaseReg0.

The Threshold is functional in the FIFO mode, and controls the Fill Offset & Status 26Ad and the Read Offset & Status 26Ai according to the low threshold (SizeReg1 from a channel register block of the allocator 22) and the high threshold (BaseReg1 from a channel register block of the allocator 22).

For a receive channel, the Read Address is supplied to the Port A Address Selector 26C and the Fill Address is supplied to the Port B Address Selector 26D. For a transmit channel, the Read Address supplied to the Port B Address Selector 26D and the Fill Address supplied to the Port A Address Selector 26C.

For a receive interface channel (e.g., 36A, 36C), where input data from a receive IF channel is stored into the dual port RAM 18 and is read out by the CPU 12, the Fill Strobe signal (dual port RAM 18 write) comes from the arbitrator 24 and Read Strobe (dual port RAM 18 read) comes from the control unit 20 (IF Strobe). The resulting Fill Address (Addr) goes to the dual port RAM 18 Port B address selector 26D, while the Read Addr goes to the dual port RAM 18 Port A address selector 26C.

For a transmit interface channel (e.g., 36B, 36D), where input data from the CPU 12 is stored into the dual port RAM 18 and is read out by a transmit interface channel, the Read Strobe comes from the IF arbitrator 24 and the Fill Strobe comes from the control unit 20 (IF Strobe). The resulting Read Addr goes to the Port B address selector 26D, and the Fill Addr goes to the Port A address selector 26C.

If the CPU 12 accesses an interface data register, and the buffer is enabled for that IF channel, the generated address is used for the Port A address bus, otherwise the CPU-generated address is used.

Figure 8:
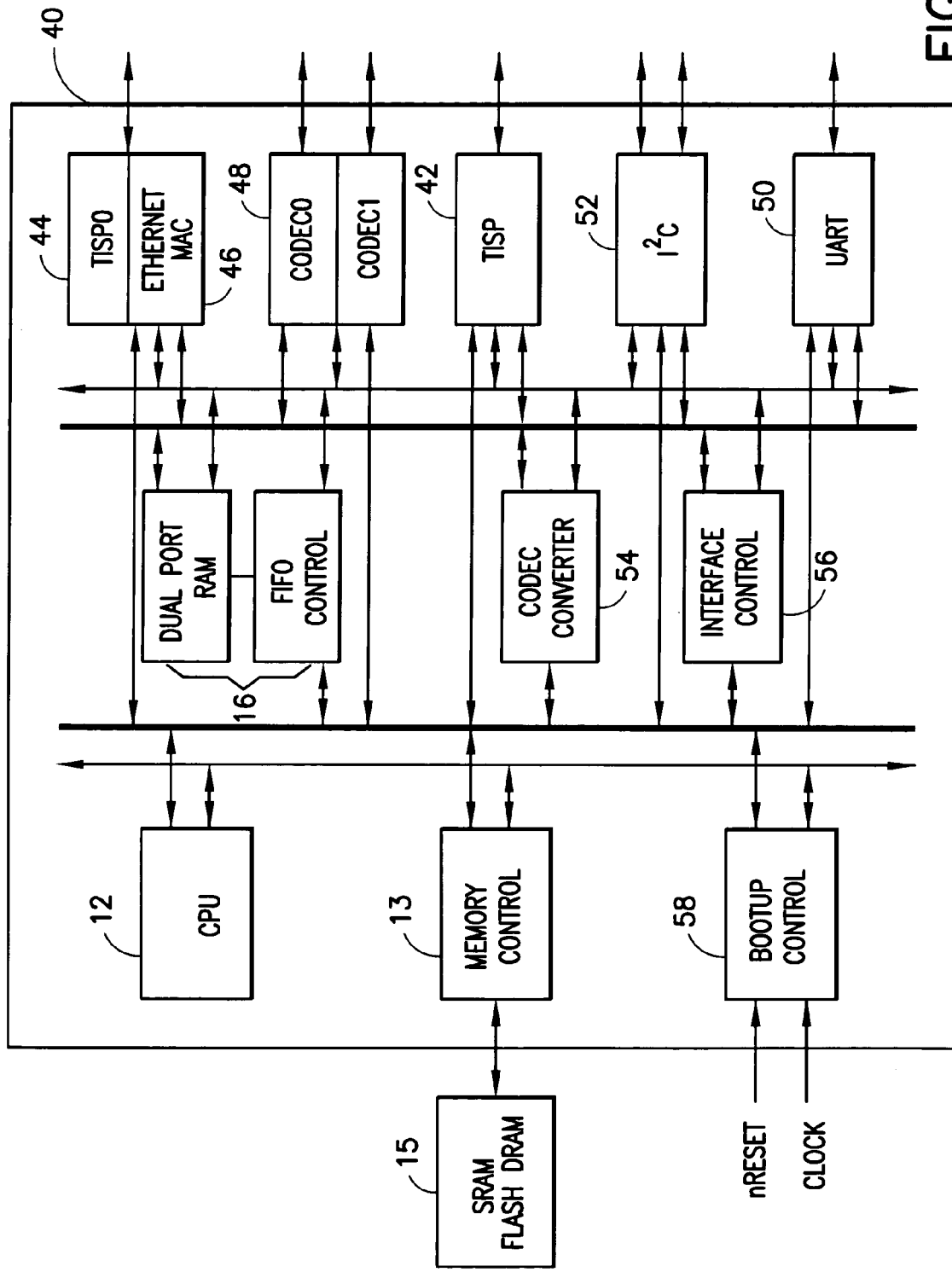
FIG. 8 is a simplified block diagram of an embodiment of the DPMU integrated within an ASIC along with a CPU and various interfaces.
Figure 9:
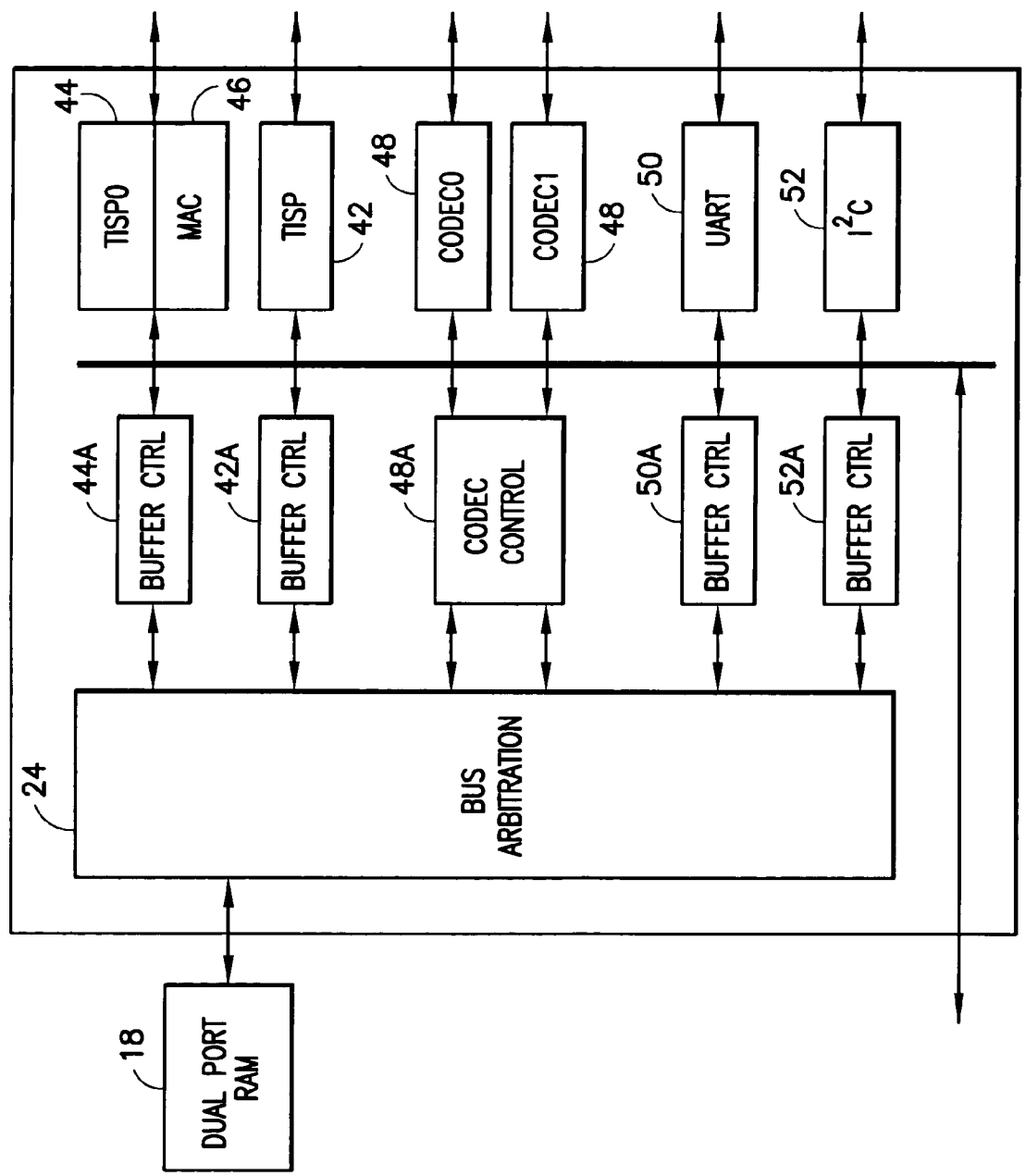
FIG. 9 shows a portion of the ASIC of FIG. 8 in greater detail, and shows a plurality of different types of interface units.

FIG. 8 is a simplified block diagram of an embodiment of the DPMU 16 integrated within an ASIC 40, along with the CPU 12 and various interfaces, while FIG. 9 shows a portion of the ASIC 40 of FIG. 8 in greater detail, and also shows a plurality of different interface controls. The CPU 12 may be a reduced instruction set computer (RISC) core, and the interfaces can be, by example, TI Serial Port interfaces 42 and 44,46 (with Ethernet MAC), CODEC interfaces 48, a UART interface 50, and an I$^2$C bus interface 52. The corresponding buffer controls are depicted in FIG. 9 as 42A, 44A, 48A, 50A and 52A. The ASIC 40 includes the DPMU 16, a CODEC conversion block 54, and an interface control block 56. A bootup control block 58 can be present, as may the memory interface 13. The system memory 15, external to the ASIC 40 in this case, may be, by example, static RAM, Flash, or dynamic RAM. The interface control 56 provides a programming interface enabling a plurality of control registers for the interfaces 42–52 to be programmed. Such programming can include, as is known in the art, the setting of interrupt conditions (e.g., buffer empty, buffer full, buffer overrun, etc.), various UART modes and baud rates, and various CODEC modes (e.g., A-law/μ-law, companded/linear mode, etc.).

Figure 10:
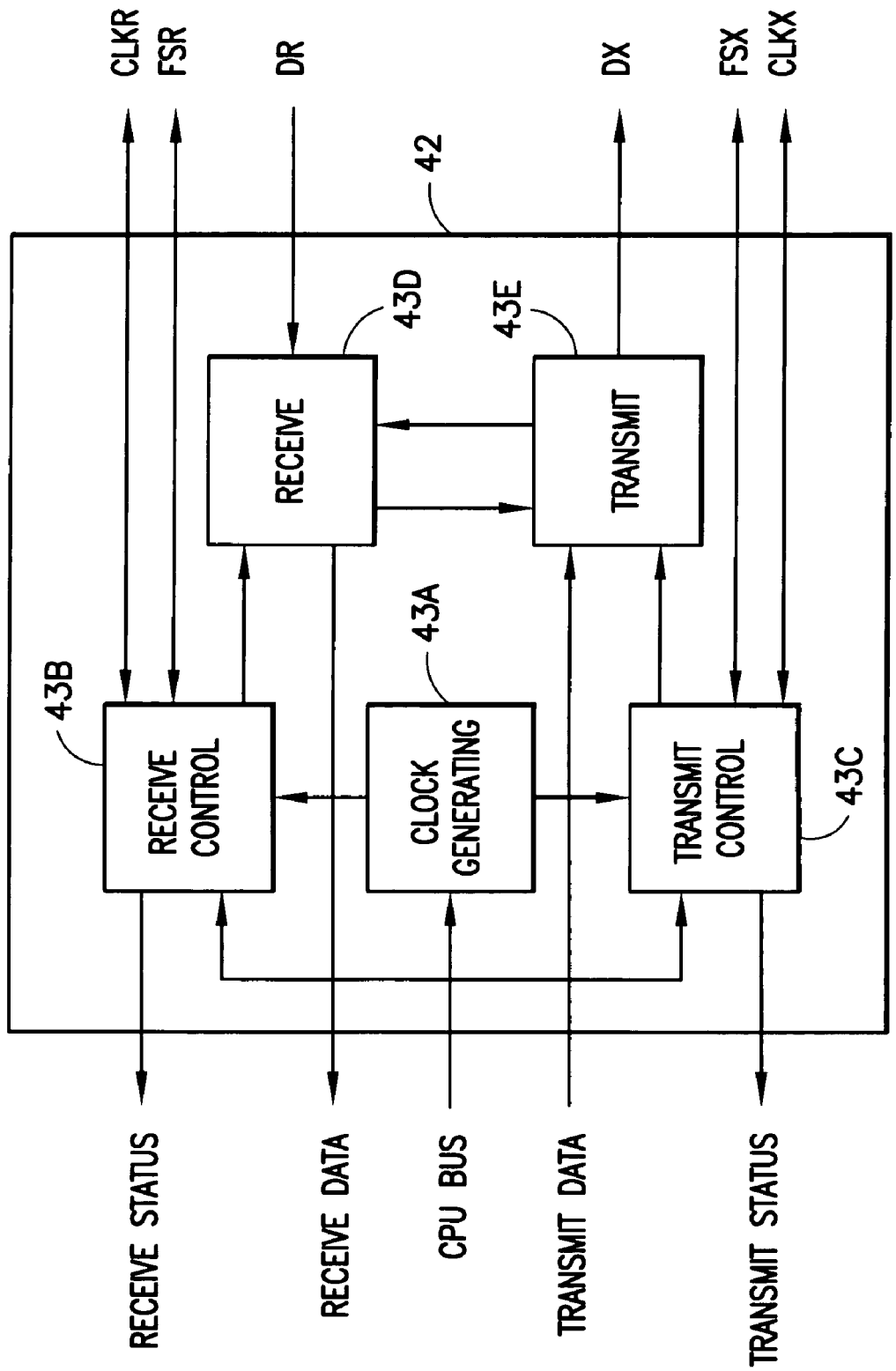
FIG. 10 is a simplified block diagram showing the construction of one of the interface units of FIG. 9.

FIG. 10 is a simplified block diagram showing the construction of an exemplary one of the interface units of FIGS. 8 and 9, specifically the TISP interface 42. The TISP 42 includes a CPU 12 programmable clock generator 43A, receive controller 43B and transmit controller 43C, as well as receive and transmit functional blocks 43D and 43E, respectively. The TISP 42 is programmable for using internal or external clocks, clock rates (e.g., 10, 5, 2.5 and 1.25 MHz), frame synchronization control and 8-bit or 16-bit data. In operation, transmit and/or receive buffers are allocated in the DPMU 18, and the TISP 42 operates with the dual port RAM 18, as opposed to requiring programmed I/O with the CPU 12 or direct DMA transfer to or from the system memory 15. However, a DMA controller could be implemented within the memory controller 15 to enable the DPMU 18 to access the system memory 15 directly.

As example of the use of the teachings of this invention, assume that the ASIC 40 is interfaced with two peripherals, one with bursty traffic, such as one operating with data packet via an Ethernet transceiver 46, and the other peripheral with a simple A-law audio code (CODEC 48). The CPU 12 first sets up the Ethernet transceiver 46 of the DPMU 16 with the desired operational modes, e.g., block mode, base addresses, the size of the blocks (e.g., the size of one packet) and the desired interrupts, so that the CPU 12 serves the corresponding data buffer in the dual port RAM 18 every time a data packet is received, and data is transmitted once a certain number of bytes of data are written to the buffer allocated in the dual port RAM 18. The CPU 12 also allocates a portion of the dual port RAM 18 for the second interface for the audio CODEC 48 by setting that portion to operate in the FIFO mode. In this operating mode, the CPU 12 sets up the addresses of the base pointers, the size of the circular FIFO buffer, and the threshold to trigger the transmit and receive interrupts (e.g., buffer full, buffer half-full, etc.)

In a typical audio application, the audio sample is continuously taken at an 8 kHz rate for both the transmit and the receive streams. If the CPU 12 is required to simultaneously serve the Ethernet interface 46 (or some other data packet link) and the audio CODEC 48, without the use of the DPMU 16, it could easily miss one or more audio samples if a large data packet is being transmitted or received.

Furthermore, if a received data packet contains digital audio information ready for the CODEC, the CPU 12 can reconfigure the buffer registers so that the digital data buffer filled from the packet interface (e.g., the Ethernet interface 46) can be used as the transmit buffer for the audio CODEC interface 48.

Another benefit of the programmable buffer structure made possible by the DPMU 16 is that the space allocated for a first interface can be reused for a second interface if the first interface is currently not being used. This enables an efficient use and reuse of the buffer memory found in the dual port RAM 18.

Applications of the ASIC 40 include, but are not limited to, voice over IP (VoIP) peripherals, low power RF (e.g., Bluetooth) peripherals, cable modems, and a variety of embedded peripherals.

The attached five page Appendix is provided to illustrate, using as an example the UART interface 50, the programming model employed by the DPMU 16.

The invention has been particularly shown and described with respect to preferred embodiments thereof, such as dual port memory size, interface types, bus widths and the like. However, it will be understood by those skilled in the art that changes in form and details may be made therein, without departing from the scope and spirit of the invention.

Appendix

UART Interface Registers

1.1.1. UART Control Register (UartCtrl)

| Bit | Name | Read/Write | Reset Value | Function |
|---|---|---|---|---|
| 15–14 | | | | Reserved. |
| 13 | RxBuff1En | R/W | 0 | Enable receive buffer 1 access when RxFifo=0. Enable FIFO high threshold check when RxFifo=1. |
| 12 | RxBuff0En | R/W | 0 | Enable receive buffer 0 access |
| 11 | TxBuff1En | R/W | 0 | Enable transmit buffer 1 access when TxFifo=0. Enable FIFO low threshold check when TxFifo=1. |
| 10 | TxBuff0En | R/W | 0 | Enable transmit buffer 0 access |
| 9 | RxFifo | R/W | 0 | Receive buffer acts as a FIFO. When RxFifo=1, only receive buffer 0 is active, |
| 8 | TxFifo | R/W | 0 | Transmit buffer acts as a FIFO. When TxFifo=1, only transmit buffer 0 is active, |
| 7 | Rts | R/W | 0 | Request to Send. Effective when UartCfg.CtlSprt set. Write 1 to this bit will force RTS pin to low state |
| 6 | ParEnb | R/W | 0 | Parity enable. ParEnb=1 enable receive parity check, and generating parity bit when transmit |
| 5–2 | | | | Reserved. |
| 1 | RxEnb | R/W | 0 | Transmit Enable. RxEnb=1 enable receive |
| 0 | TxEnb | R/W | 0 | Receive Enable. TxEnb=1 enable transmit |

1.1.2. UART Configure Register (UartCfg)

| Bit | Name | Read/Write | Reset Value | Function |
|---|---|---|---|---|
| 15 | Padding | R/W | 0 | Receive data padding. 0: fill upper 24 bit with 0, 1: fill upper 24 bit with b7 |
| 14 | CtlSprt | R/W | 0 | CTS/RTS support. When set, GPIO b0 used as CTS input signal, b8 used as RTS output signal. |
| 13 | EvnPar | R/W | 0 | Parity select. EvnPar=0: Odd, 1: Even |
| 12 | StopBit | R/W | 0 | Stop bit. StopBit=0: 1 stop bit, 1: 2 stop bits |
| 11 | DataLen | R/W | 0 | Data length. DataLen=0: 8 bit, 1: 7 bit |
| 10–0 | Rate | R/W | 1795(703H) | Baud rate setting Value=1352(548H) baudrate=1800 1004(3ECH) 2000 |

1.1.3. UART Receive Buffer 0 Base Address Register (UartRxBase0)

| Bit | Name | Read/Write | Reset Value | Function |
|---|---|---|---|---|
| 15–9 | | | | Reserved. Read as all zero. |
| 8–0 | Base | R/W | | Specifies UART receive buffer 0 base address. Aligned to 16-byte boundaries |

1.1.4. UART Receive Buffer 1 Base Address Register (UartRxBase1)

| Bit | Name | Read/Write | Reset Value | Function |
|---|---|---|---|---|
| 15–11 | | | | Reserved. Read as all zero. |
| 10–0 | Base | R/W | | UartCtrl.RxFifo=0: UART receive buffer 1 base address. Aligned to 16-byte boundaries<br>UartCtrl.RxFifo=1: Low Threshold for FIFO mode. |

1.1.5. UART Receive Buffer 0 Size Register (UartRxBuffSize0)

| Bit | Name | Read/Write | Reset Value | Function |
|---|---|---|---|---|
| 15–8 | | | | Reserved. Read as all zero. |
| 7–0 | Size | R/W | | Specifies UART receive buffer 0 size. 256-byte when Size=0. |

1.1.6. UART Receive Buffer 1 Size Register (UartRxBuffSize1)

| Bit | Name | Read/Write | Reset Value | Function |
|---|---|---|---|---|
| 15–8 | | | | Reserved. Read as all zero. |
| 7–0 | Size | R/W | | UartCtrl.RxFifo=0: Specifies UART receive buffer 1 size. 256-byte when Size=0.<br>UartCtrl.RxFifo=1: High Threshold for FIFO mode. |

1.1.7. UART Receive Buffer Fill Offset Register (UartRxFilOff)

| Bit | Name | Read/Write | Reset Value | Function |
|---|---|---|---|---|
| 15–8 | | | | Reserved. Read as all zero. |
| 7–0 | Offset | R | | UART receive buffer fill offset |

1.1.8. UART Receive Buffer Read Offset Register (UartRxRdOff)

| Bit | Name | Read/Write | Reset Value | Function |
|---|---|---|---|---|
| 15–8 | | | | Reserved. Read as all zero. |
| 7–0 | Offset | R | | UART receive buffer read offset |

1.1.9. UART Receive Status Register (UartRxSts)

| Bit | Name | Read/Write | Reset Value | Function |
|---|---|---|---|---|
| 15 | Buff1Full | R/W | 0 | Receive buffer 1 full. Set when receive buffer 1 full. |
| 14 | Buff1Empty | R/W | 1 | Receive buffer 1 empty. Set when receive buffer 0 is empty. |
| 13 | Buff0Full | R/W | 0 | Receive buffer 1 full. Set when receive buffer 1 full. |
| 12 | Buff0Empty | R/W | 1 | Receive buffer 0 empty. Set when receive buffer 0 is empty. |
| 11 | FlActBuff | R | 0 | 0: data is filled into buffer 0.<br>1: data is filled into buffer 1. |
| 10 | RdActBuff | R | 0 | 0: data is read from buffer 0.<br>1: data is read from buffer 1. |
| 9–4 | | | | Reserved. |
| 3 | FrameErr | R | 0 | Frame error. This bit will be cleared on read |
| 2 | ParErr | R | 0 | Parity error. This bit will be cleared on read |
| 1 | OverRun | R | 0 | Receive over run. This bit will be cleared on read |
| 0 | RxFull | R | 0 | Receive buffer register full. |

1.1.10. UART Receive Data Register (UartRxData)

| Bit | Name | Read/Write | Reset Value | Function |
|---|---|---|---|---|
| 31–8 | | | | Padding |
| 7–0 | Data | R | | UART receive data |

1.1.11. UART Receive Interrupt Enable Register (UartRxIntEn)

| Bit | Name | Read/Write | Reset Value | Function |
|---|---|---|---|---|
| 7 | Buff1FullEn | R/W | 0 | Receive buffer 1 full interrupt enable. |
| 6 | Buff1EmptyEn | R/W | 0 | Receive buffer 1 empty interrupt enable |
| 5 | Buff0FullEn | R/W | 0 | Receive buffer 1 full interrupt enable. |
| 4 | Buff0EmptyEn | R/W | 0 | Receive buffer 0 empty interrupt enable. |
| 3 | FrameErr | R/W | 0 | Frame error interrupt enable. |
| 2 | ParErr | R/W | 0 | Parity error interrupt enable. |
| 1 | OverRunEn | R/W | 0 | Receive over run interrupt enable. |
| 0 | RxFullEn | R/W | 0 | Receive buffer register full interrupt enable |

1.1.12. UART Transmit Buffer 0 Base Address Register (UartTxBase0)

| Bit | Name | Read/Write | Reset Value | Function |
|---|---|---|---|---|
| 15–11 | | | | Reserved. Read as all zero. |
| 10–0 | Base | R/W | | Specifies UART Transmit buffer 0 base address. Aligned to 16-byte boundaries |

1.1.13. UART Transmit Buffer 1 Base Address Register (UartTxBase1)

| Bit | Name | Read/Write | Reset Value | Function |
|---|---|---|---|---|
| 15–11 | | | | Reserved. Read as all zero. |
| 10–0 | Base | R/W | | UartCtrl.TxFifo=0: Specifies UART Transmit buffer 1 base address. Aligned to 16-byte boundaries UartCtrl.TxFifo=1: low Threshold for FIFO mode. |

1.1.14. UART Transmit Buffer 0 Size Register (UartTxBuffSize0)

| Bit | Name | Read/Write | Reset Value | Function |
|---|---|---|---|---|
| 15–8 | | | | Reserved. Read as all zero. |
| 7–0 | Size | R/W | | Specifies UART Transmit buffer 0 size. 256-byte when Size=0. |

1.1.15. UART Transmit Buffer 1 Size Register (UartTxBuffSize1)

| Bit | Name | Read/Write | Reset Value | Function |
|---|---|---|---|---|
| 15–11 | | | | Reserved. Read as all zero. |
| 7–0 | Size | R/W | | UartCtrl.TxFifo=0: Specifies UART Transmit buffer 1 size. 256-byte when Size=0. UartCtrl.TxFifo=1: High Threshold for FIFO mode. |

1.1.16. UART Transmit Buffer Fill Offset Register (UartTxFilOff)

| Bit | Name | Read/Write | Reset Value | Function |
|---|---|---|---|---|
| 15–11 | | | | Reserved. Read as all zero. |
| 10–0 | Offset | R | | UART transmit buffer fill offset |

1.1.17. UART Transmit Buffer Read Offset Register (UartTxRdOff)

| Bit | Name | Read/Write | Reset Value | Function |
|---|---|---|---|---|
| 15–11 | | | | Reserved. Read as all zero. |
| 10–0 | Offset | R | | UART transmit buffer send out offset |

1.1.18. UART Transmit Status Register (UartTxSts)

| Bit | Name | Read/Write | Reset Value | Function |
|---|---|---|---|---|
| 15 | Buff1Full | R/W | 0 | Transmit buffer 1 full. Set when transmit buffer 1 is full. |
| 14 | Buff1Empty | R/W | 1 | Transmit buffer 1 empty. Set when transmit buffer 1 is empty. |
| 13 | Buff0Full | R/W | 0 | Transmit buffer 0 full. Set when transmit buffer 0 is full. |

-continued

1.1.18. UART Transmit Status Register (UartTxSts)

| Bit | Name | Read/Write | Reset Value | Function |
|---|---|---|---|---|
| 12 | Buff0Empty | R/W | 1 | Transmit buffer 0 empty. Set when transmit buffer 0 is empty. |
| 11 | FlActBuff | R | 0 | Receive buffer 1 active. When set, indicates data received is filled into buffer 1. |
| 10 | RdActBuff | R | 0 | Transmit buffer 1 active. When set, indicates data is sent out from buffer 1. |
| 9–2 | | | | Reserved. |
| 1 | Cts | R | | Clear to send. Effective when CtlSprt set. Cts low indicates that data on DOUT can be transmitted. |
| 0 | TxEmpty | R | 1 | Transmit buffer Register empty. |

1.1.19. UART Transmit Data Register (UartTxData)

| Bit | Name | Read/Write | Reset Value | Function |
|---|---|---|---|---|
| 31–8 | | | | Not used. |
| 7–0 | Data | W | | UART transmit data |

1.1.20. UART Transmit Interrupt Enable Register (UartTxIntEn)

| Bit | Name | Read/Write | Reset Value | Function |
|---|---|---|---|---|
| 7 | Buff1FullEn | R/W | 0 | Transmit buffer 1 full interrupt enable. |
| 6 | Buff1EmptyEn | R/W | 0 | Transmit buffer 1 empty interrupt enable. |
| 5 | Buff0FullEn | R/W | 0 | Transmit buffer 0 full interrupt enable. |
| 4 | Buff0EmptyEn | R/W | 0 | Transmit buffer 0 empty interrupt enable. |
| 3–1 | | | | Reserved. |
| 0 | EmptyEn | R/W | 0 | Transmit buffer register empty interrupt enable |

1.1.21. UART Test Control Register (UartTestCtrl)

| Bit | Name | Read/Write | Reset Value | Function |
|---|---|---|---|---|
| 15–2 | | | | Reserved. Read as all zero. |
| 1 | Mode | | 0 | Test mode:<br>0-Loop back test. transmitted data will send to receive channel using internal timing<br>1-Loop out. received data will send to transmit channel using their own timing |
| 0 | TestEn | R/W | 0 | UART test enable. If set, the operation is defined by Mode. |

The invention claimed is:

1. A programmable buffer circuit for interfacing a CPU to a plurality of channel interfaces, comprising:
   a single dual port memory having a first port coupled to a CPU data bus and a second port coupled to a channel data bus that serves said plurality of channel interfaces;
   an arbitrator for arbitrating access to said dual port memory by individual ones of said channel interfaces over said channel data bus for selectively storing data in and reading data from said single dual port memory;
   an address generator for generating dual port memory addresses for selectively reading data from and writing data to said single dual port memory using said CPU data bus and said channel data bus; and
   an allocator and control unit programmable by said CPU for specifying individual ones of buffer locations and buffer sizes within said single dual port memory for individual ones of said channel interfaces, and for enabling individual ones of said buffers, said allocator having outputs coupled to said address generator for controlling the generation of addresses thereby depending on which channel interface is currently selected for access to said single dual port memory, wherein in a first case said control unit operates individual ones of channel buffers in a block access mode of operation using a set of channel registers and in a second case said control unit operates said individual ones of channel buffers in a first in/first out (FIFO) access mode of operation using said same set of channel registers.

2. A programmable buffer circuit as in claim 1, wherein at least said dual port memory, said CPU and said plurality of interface channels are contained within a common integrated circuit package.

3. A programmable buffer circuit as in claim 1, wherein one of said plurality of interface channels is comprised of an audio CODEC.

4. A programmable buffer circuit as in claim 1, wherein one of said plurality of interface channels is comprised of a serial data interface.

5. A programmable buffer circuit as in claim 1, wherein one of said plurality of interface channels is comprised of a packet data interface channel.

6. A programmable buffer circuit as in claim 1, wherein individual ones of said plurality of interface channels are comprised of a receive interface and a transmit interface, and wherein said allocator comprises a corresponding plurality of registers for specifying at least a starting address and a size for each of said receive interface and said transmit interface.

7. A programmable buffer circuit as in claim 1, wherein individual ones of said plurality of interface channels are comprised of a receive interface and a transmit interface, and wherein said buffer circuit is programmable for specifying a receive buffer of one channel interface to be a transmit buffer of another channel interface.

8. A method for operating a programmable buffer circuit for interfacing a CPU to a plurality of channel interfaces, comprising:

providing a single dual port memory having a first port coupled to a CPU data bus and a second port coupled to a channel data bus that serves said plurality of channel interfaces;

programming a control unit for specifying a set of channel registers individual ones of buffer locations and buffer sizes within said single dual port memory for individual ones of said channel interfaces and using said set of channel registers in a first case to operate individual ones of channel buffers in a block access mode and in a second case using said same set of channel registers to operate said individual ones of channel buffers in a first in/first out (FIFO) access mode of operation;

arbitrating for access to said single dual port memory by individual ones of said channel interfaces over said channel data bus; and generating dual port memory addresses for selectively reading data from and writing data to said single dual port memory using said CPU data bus and said channel data bus, the generation of said addresses depending on which channel interface is currently selected for access to said dual port memory, and on the specified buffer location and size within said dual port memory for the selected one of said channel interfaces.

9. A method as in claim 8, wherein at least said dual port memory, said CPU and said plurality of interface channels are contained within a common integrated circuit package.

10. A method as in claim 8, wherein one of said plurality of interface channels is comprised of an audio CODEC, and wherein another one of said plurality of interface channels is comprised of at least one of a serial data interface and a packet data interface.

11. A method as in claim 8, wherein individual ones of said plurality of interface channels are comprised of a receive interface and a transmit interface, and wherein programming specifies at least a staffing address and a size for each of said receive interface and said transmit interface.

12. A method as in claim 8, wherein individual ones of said plurality of interface channels are comprised of a receive interface and a transmit interface, and wherein said step of programming specifies a receive buffer of one channel interface to be a transmit buffer of another channel interface.

13. A programmable buffer circuit for interfacing a data processor to a plurality of channel interfaces, comprising:

a single dual port memory having a first port coupled to a processor data bus and a second port coupled to a channel data bus that serves said plurality of channel interfaces;

an arbitrator for arbitrating access to said dual port memory by individual ones of said channel interfaces over said channel data bus for at least one of reading data from and for writing data to said dual port memory;

an address generator for generating dual port memory addresses for at least one of reading data from and writing data to said dual port memory using said data processor data bus and said channel data bus; and a control unit programmable by said data processor for specifying for individual ones of buffers both buffer locations and buffer sizes within said single dual port memory for individual ones of said channel interfaces, where said control unit is programmable in a first case for operating individual ones of said buffers in a block access mode of operation and operating in a second case said individual ones of said buffers in a first in/first out (FIFO) access mode of operation using said same set of channel registers.

14. A programmable buffer circuit as in claim 13, wherein individual ones of said plurality of interface channels are comprised of a receive interface and a transmit interface, and wherein said buffer circuit is programmable for specifying a receive buffer of one channel interface to be a transmit buffer of another channel interface.

15. A programmable buffer circuit for interfacing a data processor to a plurality of channel interfaces, comprising:

a dual port memory having a first port coupled to a processor data bus and a second port coupled to a channel data bus that serves said plurality of channel interfaces;

an arbitrator for arbitrating access to said dual port memory by individual ones of said channel interfaces over said channel data bus for at least one of reading data from and for writing data to said dual port memory;

an address generator for generating dual port memory addresses for at least one of reading data from and writing data to said dual port memory using said data processor data bus and said channel data bus; and a control unit programmable by said data processor for specifying individual ones of buffer locations and buffer sizes within said dual port memory for individual ones of said channel interfaces, where there are four transmit registers allocated for each channel interface designated as BaseReg0, BaseReg1, SizeReg0 and SizeReg1 and four receive registers also designated as BaseReg0, BaseReg1, SizeReg0 and SizeReg1, said control unit being responsive to operating in a Block Mode to provide two independent buffers Buffer0 and Buffer1, where BaseReg0 stores the staffing address of Buffer0, SizeReg0 specifies the size of Buffer0, BaseReg1 stores the starting address of Buffer1, and SizeReg1 specifies the size of Buffer1 size, said control unit being further responsive to operating in a FTFO Mode to provide one buffer, where BaseReg0 stores the start address of the single buffer, SizeReg0 specifies the size of the single buffer, BaseReg1 functions as a Low Threshold Register, and said register SizeReg1 functions as a High Threshold Register.

16. A programmable buffer circuit for interfacing a data processor to a plurality of channel interfaces, comprising:

a dual port memory having a first port coupled to a processor data bus and a second port coupled to a channel data bus that serves said plurality of channel interfaces;

an arbitrator for arbitrating access to said dual port memory by individual ones of said channel interfaces over said channel data bus for selectively reading data from and writing data to said dual port memory;

an address generator for generating dual port memory addresses for selectively reading data from and writing data to said dual port memory using said processor data bus and said channel data bus; and a control unit programmable by said data processor for specifying individual ones of buffer locations and buffer sizes within said dual port memory for individual ones of said channel interfaces, where said control unit is operable to set up and operate a first portion of said dual port memory in a block mode of operation having a transmit buffer and a receive buffer, and to also operate a second portion of the dual port memory in a FIFO mode of operation having a single buffer wherein a single set of channel registers controls the operation in said block mode and in said FIFO mode.

17. A programmable buffer circuit as in claim 16, where said first portion of said dual port memory is coupled to a data packet channel interface, and where said second portion of said dual port memory is coupled to an audio CODEC.

18. A programmable buffer circuit for interfacing a CPU to a plurality of channel interfaces, comprising:

a single dual port memory having a first port coupled to a CPU data bus and a second port coupled to a channel data bus that serves said plurality of channel interfaces;

means for arbitrating access to said dual port memory by individual ones of said channel interfaces over said channel data bus for selectively storing data in and reading data from said single dual port memory;

means for generating dual port memory addresses for selectively reading data from and writing data to said single dual port memory using said CPU data bus and said channel data bus; and means for allocating and means for controlling programmable by said CPU for specifying individual ones of buffer locations and buffer sizes within said single dual port memory for individual ones of said channel interfaces, and for enabling individual ones of said buffers, said allocator means having outputs coupled to said address generating means for controlling the generation of addresses thereby depending on which channel interface is currently selected for access to said single dual port memory, wherein in a first case said controlling means operates individual ones of channel buffers in a block access mode of operation using a set of channel registers and in a second case said controlling means unit operates said individual ones of channel buffers in a first in/first out (FIFO) access mode of operation using said same set of channel registers.

19. The programmable buffer circuit of claim 15 wherein at least said dual port memory and said plurality of channel interfaces are contained within a common integrated circuit package.

* * * * *

UNITED STATES PATENT AND TRADEMARK OFFICE
CERTIFICATE OF CORRECTION

PATENT NO. : 7,054,986 B2
APPLICATION NO. : 09/823159
DATED : May 30, 2006
INVENTOR(S) : Zhao et al.

It is certified that error appears in the above-identified patent and that said Letters Patent is hereby corrected as shown below:

In Claim 11, Column 15, line 49 delete "staffing" and replace with --starting--.

In Claim 15, Column 16, line 46 delete "staffing" and replace with --starting--.

Signed and Sealed this

Fifth Day of September, 2006

JON W. DUDAS
*Director of the United States Patent and Trademark Office*